United States Patent [19]
Woods

[11] Patent Number: 5,800,754
[45] Date of Patent: Sep. 1, 1998

[54] BUILDING MATERIALS FROM RECYCLED TIRES

[76] Inventor: Richard J. Woods, 13347 E. Temple, La Puente, Calif. 91748

[21] Appl. No.: 879,720

[22] Filed: Jun. 20, 1997

[51] Int. Cl.$^6$ ........................................... B29B 43/02
[52] U.S. Cl. ............................... 264/115; 264/912
[58] Field of Search ........................... 264/115, 912

[56] References Cited

U.S. PATENT DOCUMENTS

| | | | |
|---|---|---|---|
| 3,948,009 | 4/1976 | Bernhard . | |
| 4,244,841 | 1/1981 | Frankland | 264/109 |
| 5,094,905 | 3/1992 | Murray | 428/903.3 |
| 5,106,554 | 4/1992 | Drews | 264/112 |
| 5,292,467 | 3/1994 | Mandish et al. | 264/112 |
| 5,316,708 | 5/1994 | Drews | 264/40.5 |
| 5,425,904 | 6/1995 | Smits | 264/115 |
| 5,439,735 | 8/1995 | Jamison | 264/122 |
| 5,523,328 | 6/1996 | Osenbaum et al. | 264/115 |

*Primary Examiner*—Mary Lynn Theisen
*Attorney, Agent, or Firm*—Edgar W. Averill, Jr.

[57] ABSTRACT

A process for forming a building unit from ground motor vehicle tires. The process includes the steps of grinding a number of tires to create a ground tire mixture which includes ground rubber metal strands and fiber pieces. Between 15% and 20% of adhesive comprising asphalt is added to the mixture. The asphalt containing mixture is then placed into a heated mold and subjected to heat and pressure to form a building unit such as a block. The metal may be removed after the grinding step by passing the ground material under a magnet. The thinnest block is strong enough to form a structure and yet pliable enough to permit an insertion or nails or screws.

7 Claims, 3 Drawing Sheets

BUILDING MATERIALS FROM RECYCLED TIRES

BACKGROUND OF THE INVENTION

The field of the invention is two fold. The first feature of the present invention relates to building materials for forming walls and other structures and the second feature relates to the recycling of motor vehicle tires.

It has been estimated that three billion tires have been dumped into U.S. dumps and land fills. This creates numerous problems including the fact that water collects in discarded tires to provide breeding sites for mosquitoes and the tires are unsightly.

It is thus important that procedures be developed which remove the large number of discarded motor vehicle tires. While numerous processes have been developed to utilize the tread portion of tires for rubber mats and as a portion of highway surfacing materials, the walls of tires and the bead of the tire contain metal and fabric which are not easily adapted use for mats or on roadways.

BRIEF SUMMARY OF THE INVENTION

It is an object of the present invention to provide a process for utilizing discarded motor vehicle tires to create blocks which can be used for the building of walls or other structures.

The present invention is for a process for forming a building unit comprising the steps of grinding a plurality of tires to create a ground tire mixture, including ground rubber, metal stand fragments and fiber pieces. Next, between 15% and 20% of an adhesive comprising asphalt is added to the ground tire mixture to provide a ground tire/asphalt mixture. The ground tire/asphalt mixture is placed into a mold and the mixture is subjected to heat and pressure, thereby creating a shaped unit. The shaped unit is removed from the mold and permitted to cool. The resulting cooled product is useful for building walls and other structures.

DESCRIPTION OF THE PREFERRED EMBODIMENTS

Figure 1:
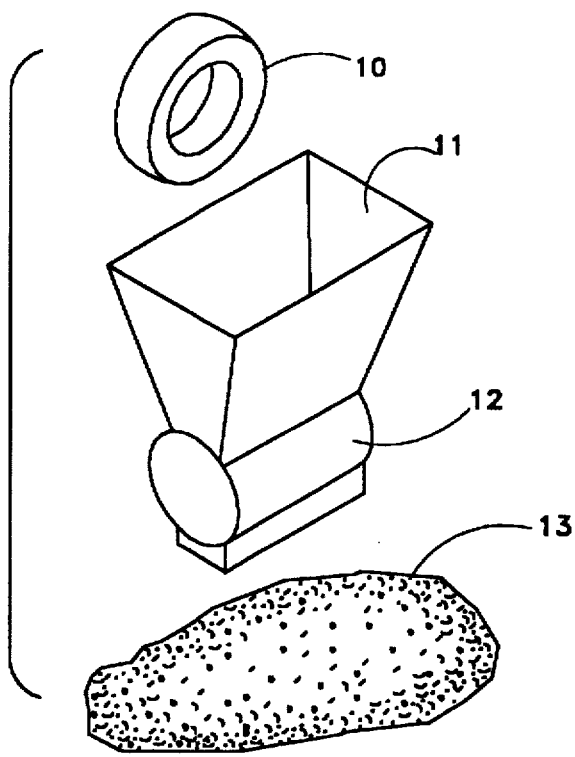
FIG. 1 is a perspective diagrammatic view of the tire grinding portion of the present invention.
Figure 2:
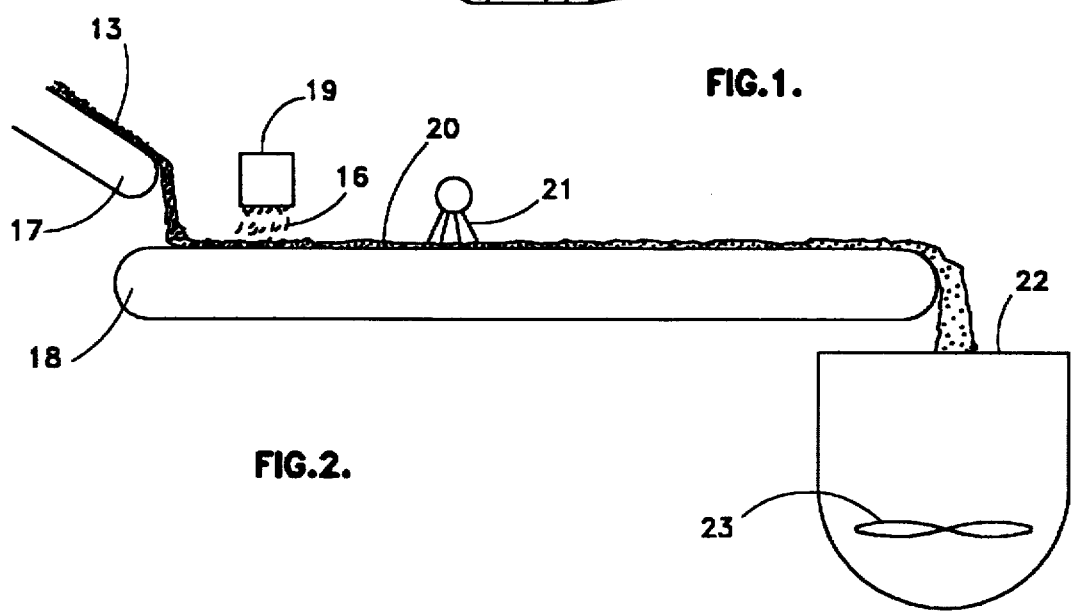
FIG. 2 is a diagrammatic side view showing the mixing of the ground tire mixture with asphalt.
Figure 3:
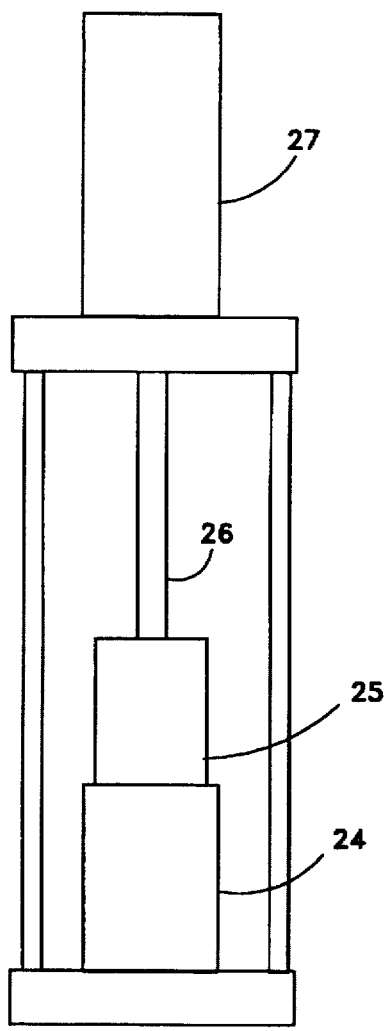
FIG. 3 is a side view of a molding process.
Figure 4:
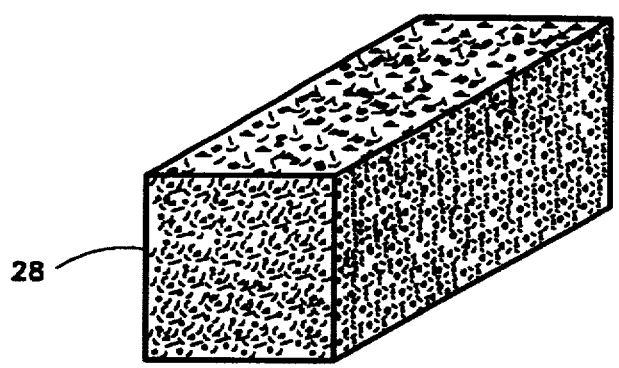
FIG. 4 is a perspective view of a formed block.
Figure 5:
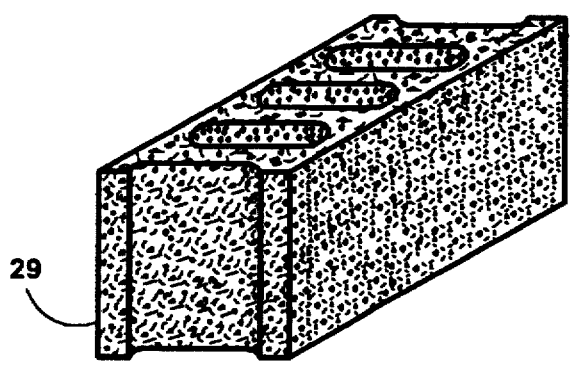
FIG. 5 is a perspective view of an alternate configuration of the block of FIG. 4.
Figure 6:
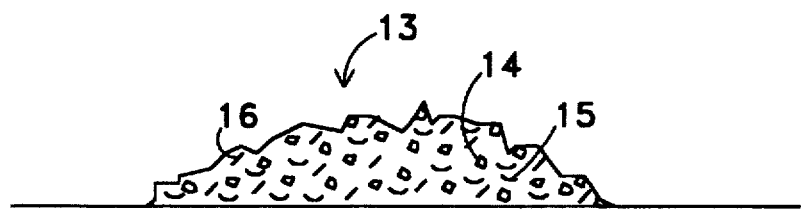
FIG. 6 is a side view of the ground tire mixture utilized in the process of the present invention.
Figure 7:
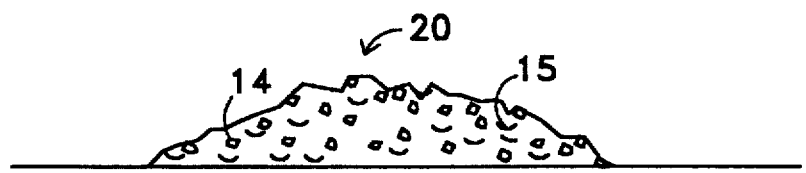
FIG. 7 is a view of the ground tire mixture of FIG. 6 with the metal fragments removed.

The process of the present invention starts with used vehicle tires such as tire 10 shown in FIG. 1. Tire 10 is placed in a bin 11 of grinder 12 to produce a ground tire mixture 13. An enlarged view of ground tire mixture 13 is shown in FIG. 6 where rubber fragments 14, fabric strands 15 and metal strand fragments 16 can be seen. This ground tire mixture 13 is conveyed by a conveyor 17 onto the upper surface of moving belt 18. The moving ground tire mixture 13 passes under a magnet 19 which removes the metal strand fragments 16 and provides a ground tire mixture containing rubber fragments and fabric strands only indicated by reference character 20 in FIGS. 2 and 7. A spray of asphalt which is heated to a molten state is indicated by reference character 21 in FIG. 2. The heated asphalt is added to the ground tire-fabric mixture 20 and this combination of essentially metal-free ground tire mixture and asphalt is passed into a mixer 22. In mixer 22, an agitator blade 23 is shown diagrammatically and the conglomerate is mixed to form a relatively uniform mixture. This mixture, while it is still warm, is then placed in a mold 24 shown in FIG. 3. A piston 25 is placed into the top of mold 24 and pressure is exerted through rod 26 by way of cylinder 27 as shown in FIG. 3. The pressure should be between about 5 and 30 psi. The asphalt should be heated to between 350° F. and 500° F. as it is sprayed to provide a heated mixture. Alternatively, the mixture may be reheated or the mold may be heated. The compressed and heated mixture is then removed from the mold where it may be made into several shapes. One such shape is a rectangular cube 28 shown in FIG. 4. A cinder block shape 29 is shown in FIG. 5. The resulting block is strong enough to permit the making of structures and yet is sufficiently pliable to permit the insertion of nails, screws and other fasteners. The formed block has excellent water resistance and excellent sound transmission resistance and can be used for sound restraining walls along highways. Alternatively, the material may be used for structures which come into contact with sea water or lake water and provide an excellent water resistant building material. The use of this material has the advantage of removing vehicle tires from the environment. The metal fragments 16 can also be recycled by conventional techniques.

The result is a process which starts with a raw material which is of essentially no cost, and in fact, at the present time, the government provides for the payment for disposal of used tires. Thus, the process of the present invention, instead of starting with raw materials which cost money, actually starts with a raw material which pays money. The asphalt used in the process is also a low cost material being a material that is left after useful products such as gasoline, diesel fuel and motor oil have been removed from crude oil. The blocks may be painted or otherwise surfaced to provide an attractive outer exterior appearance. Furthermore, steel reinforcing and concrete can be placed in the openings of the cinder block shaped building units of FIG. 5. Other end uses are K-rails for safety walls for highways, vaults for protecting caskets, sea walls and most other uses where building blocks are utilized.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A process for forming a building unit comprising:

grinding a plurality of tires into a mixture including ground rubber, metal strand fragments and fiber pieces;

adding between 15% and 20% of an adhesive comprising asphalt to form a ground tire/asphalt mixture;

placing a quantity of ground tire/asphalt mixture into a heated mold formed in the shape of a building unit;

applying heat and pressure to the ground tire/asphalt mixture to create a shaped unit;

removing the shaped unit from the mold to form a molded building unit; and allowing the molded building unit to cool to form a finished building unit.

2. The process of claim 1 wherein said pressure is about 5–30 psi.

3. The process of claim 1 where said heat is between 300° F. and 500° F.

4. The process of claim 1 wherein the mold has a highly polished interior surface.

5. The process of claim 4 wherein the mold is in the shape of a conventional cement block.

6. The process of claim 1 further including the step of removing the metal strand fragments from said ground tire mixture after said grinding step.

7. The process of claim 6 wherein said removing step is carried out by passing the ground tire mixture past a magnet.

* * * * *